A. PAPE.
MOWING MACHINE.
APPLICATION FILED FEB. 1, 1911.

1,009,853.

Patented Nov. 28, 1911.

2 SHEETS—SHEET 2.

Witnesses:
Frank W Benn
Amy Jehle

Inventor:-
Amand Pape
BY: Fred Gerlach
his Atty.

UNITED STATES PATENT OFFICE.

AMAND PAPE, OF WILLOW SPRINGS, ILLINOIS.

MOWING-MACHINE.

1,009,853.

Specification of Letters Patent.  Patented Nov. 28, 1911.

Application filed February 1, 1911. Serial No. 606,064.

*To all whom it may concern:*

Be it known that I, AMAND PAPE, a resident of Willow Springs, in the county of Cook and State of Illinois, have invented certain new and useful Improvements in Mowing-Machines, of which the following is a full, clear, and exact description.

The present invention relates to mowing machines. In these machines as now usually constructed, it is customary to provide a cutter-bar having "V" shaped knives thereon, which operate through and in conjunction with, guard-fingers, being the same in number as the knives and the stroke of the knives being approximately the distance between the centers of the guard-fingers. It has also been found in practice that when the grain or grass is wet or the soil is wet, the cutter-bar and guard-fingers soon become clogged and thus the machine would be rendered inoperative under these conditions.

The present invention designs to overcome this difficulty in mowing machines and to provide improved mechanism which will efficiently operate in wet or wiry grain or grass without becoming clogged or inoperative.

In practice I have discovered that in many machines in which the number of cutter knives correspond substantially to the number of guard-fingers and in which the stroke of the knife is substantially the same as the distance between the centers of the fingers there is insufficient opportunity for the cutter-blades to sever all of the grain or grass passing between the fingers and I have also discovered that by providing the cutter-bar with a number of blades equal approximately to one-half of the guard fingers and by spacing the bases of the knives apart and imparting to the knives a sufficient stroke to pass completely through, at least, one of the fingers and approximately the distance corresponding to that between the centers of alternate guard-fingers, the machine will operate most successfully in wet grass or grain and all clogging will be avoided.

The invention consists of several novel features hereinafter set forth and more particularly defined by claims at the conclusion hereof.

Figure 1:
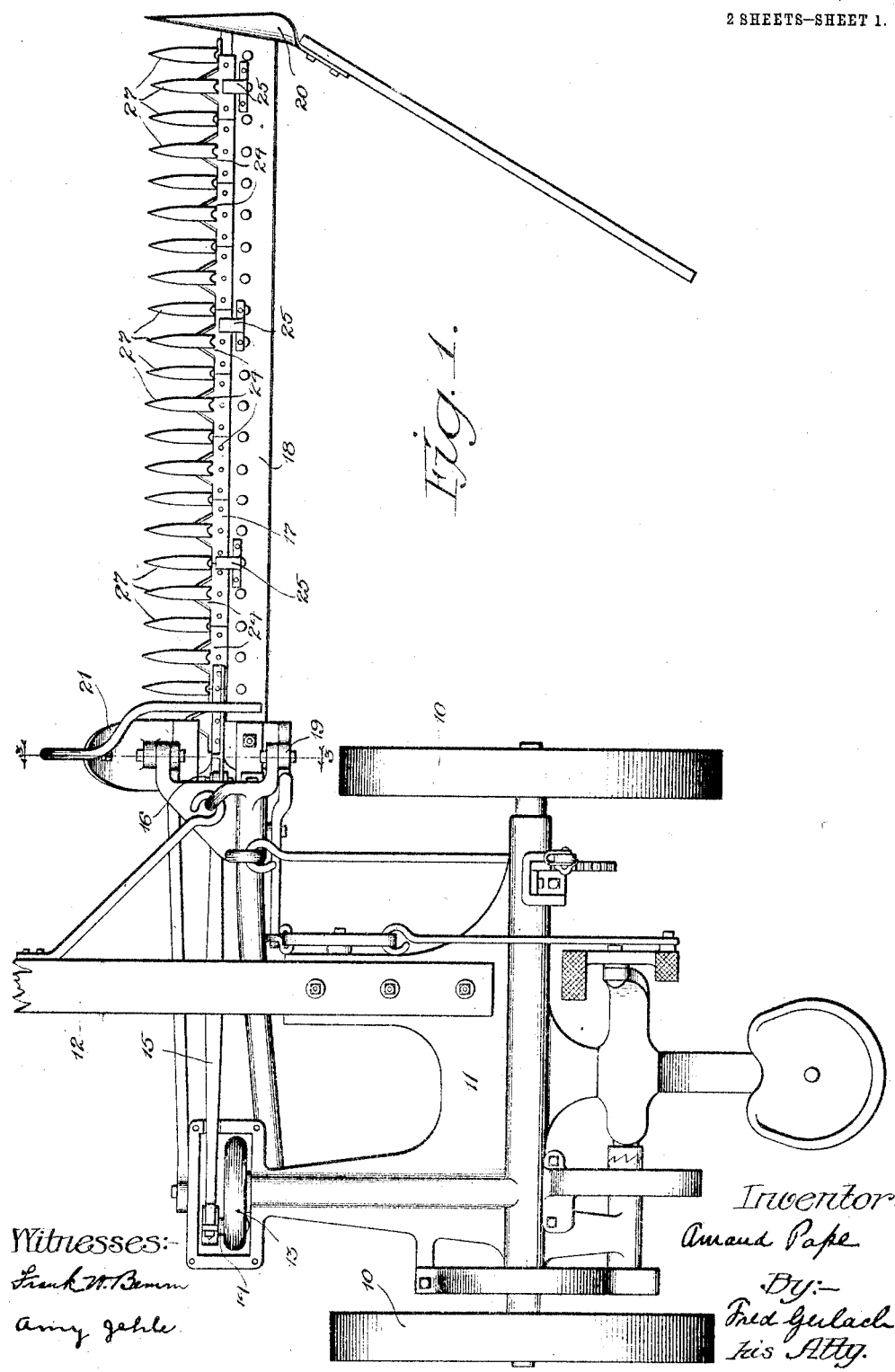
Figure 2:
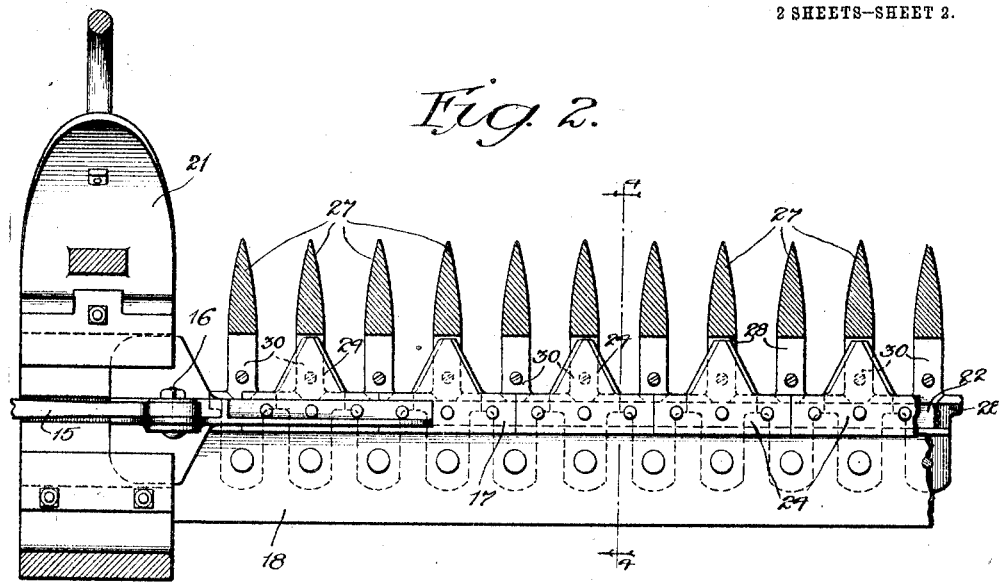
Figure 3:
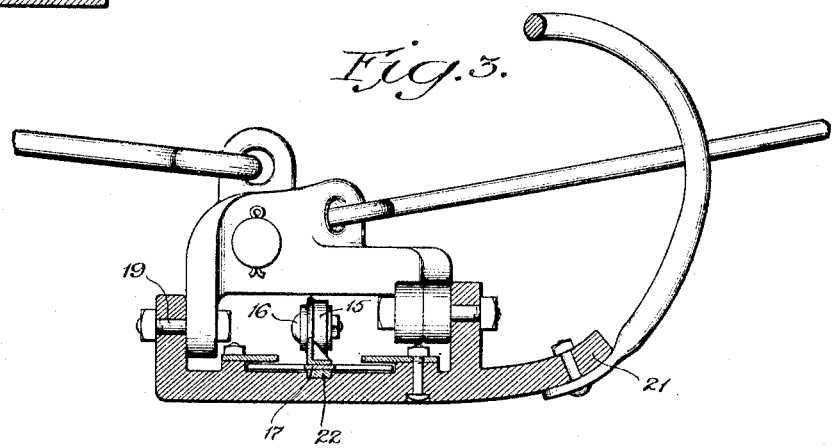
Figure 4:
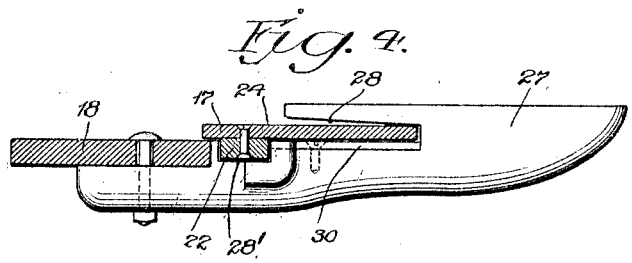

In the drawing: Figure 1 is a plan of mowing machine embodying the invention. Fig. 2 is a horizontal section taken through the guard-fingers, on an enlarged scale. Fig. 3 is a section taken on line 3—3 of Fig. 1. Fig. 4 is a section taken on line 4—4 of Fig. 2.

The machine is sustained by ground-wheels 10, and a suitable frame 11 is mounted on an axle extending through the wheels. A tongue 12 is secured to frame 11 and suitable gearing, which may be of usual construction, is inclosed by the frame 11, as well understood in the art. This gearing comprises a crank 13, carrying a wrist-pin 14, the crank being driven by the gearing which is operated by one or both of the ground wheels. This crank and wrist-pin operate a pitman 15, which is pivotally connected as at 16 to a reciprocable cutter-bar 17. The finger-bar 18 is pivotally connected to the frame as at 19 so its outer end may be raised and lowered. A divider 20 is secured to the outer end of finger-bar 18 and a shoe 21 is secured to the inner end thereof. The cutter-bar carries a series of V-shaped cutters or blades 24. Guides 25 secured to the finger-bar are adapted to hold the cutter-bar in operative relation to a series of fingers 27, and the latter are provided with a groove 28' in which bar 22 slides. The V-shaped cutters are separated from each other, a distance corresponding substantially to the width of the cutters. Each finger has a channel 28 through which the cutters travel, and a plate 30 forms the lower face of the channel and cutting-edges on the fingers are adapted to coöperate with the cutting edges of the knives.

As distinguished from prior constructions the relative number of fingers and V-shaped blades has been varied, so that there are substantially twice as many fingers as there are blades and the stroke of the blades is sufficient to cause each knife to pass completely through at least one of the fingers and this change results in a materially different operation from that resulting in a mower in which the stroke of the knives of cutters equals, substantially the distance between the centers of two adjacent fingers, because in the latter construction when grass is wet and wiry it will be flexed by the knives and drawn through the channels in the fingers without being cut before the knives begin to slide in the opposite direction. In the present construction, however, the increased stroke of the knives causes them to sever the grass passed between the fingers, because the knives, during each reciprocation, pass completely across or through one finger and in practice it has been found that wet and wiry grass will not clog the cutting mechanism and fingers or render the same inoperative, but will be cleanly cut and the machine will remain operative under these adverse conditions.

It will be observed that the side-edges of the adjacent V-shaped knives are spaced apart where they join the cutter-bar and there is a longitudinally extending non-cutting surface between the back ends of adjacent knives, with the result that the back ends of the inclined cutting-edges or bases of the knives are so spaced apart from one another, that a space of the full depth of the knives, corresponding approximately to the width of a knife is provided between adjacent knives. These spaces permit the grass to pass rearwardly between the fingers and into the crotch formed between the knives or between the points where the diagonal edges of the knives join the cutter-bar. For example, when the apices of the knives are midway between adjacent fingers, there will be no part of the cutting-edges between alternate pairs of fingers, and resultantly the grass will have ample opportunity to pass into these clear spaces, and be acted upon by the full diagonal cutting-edges of the knives, thereby preventing the grass, particularly when wet and wiry, from being flexed by the knives and drawn through the channels in the fingers without being cut, before the knives begin to slide in the opposite direction or before it will be flexed downwardly to the ground, as frequently results when wet grass does not fully enter the spaces between the knives and at the back thereof. Furthermore, when the apices of the knives are in the fingers, there will be a longitudinally extending space between the base of each knife and the adjacent fingers, so that the grass will readily pass to the cutter-bar and be subjected to the action of the entire cutting-edge of a knife.

The invention is one which may be readily applied to mowers of the general type now in common use, because the invention may be applied thereto by equipping the machine with a sufficient number of fingers and the proper number of blades and making provision for a sufficient stroke of the cutters to cause them to pass substantially between alternate fingers and completely through or across the immediate fingers during each stroke or reciprocation.

So far as I am aware, the invention presents the first instance in which the efficiency of the machine to operate in wet grass or grain has been increased by making provision for operating the knives substantially from center to center of alternate fingers and by having substantially twice as many fingers as blades to accomplish this result.

Having thus described the invention what I claim as new and desire to secure by Letters Patent is:

1. In a mowing machine, the combination of a reciprocable cutter-bar having a series of knives thereon, a series of fingers through which the knives operate, longitudinally extending spaces being formed between the rear portions of the cutting-edges of adjacent knives, and mechanism for reciprocating the cutter-bar and knives, comprising means for imparting bodily movement to the knives to cause them to pass completely through a finger during each reciprocation.

2. In a mowing machine, the combination of a reciprocable cutter-bar having a series of knives thereon, longitudinally extending spaces being formed between the back portions of the cutting-edges of the knives, fingers through which the knives operate, there being a finger for each knife and a finger for each space between the knives, and mechanism for operating the cutter-bar to cause the knives thereon to travel across the spaces between three adjacent fingers during each reciprocation and bodily and completely through a finger.

3. In a mowing machine, the combination of a reciprocable cutter-bar, having a series of V-shaped knives thereon, longitudinally extending spaces being formed between the bases of the knives at points where they join the cutter-bar, there being a finger for each knife and an intermediate finger for each space between the knives, and mechanism for operating the cutter-bar to cause the knives to travel between alternate fingers and completely and bodily through the intermediate fingers.

4. In a mowing-machine, the combination of a reciprocal "cutter-bar" a series of V-shaped knives thereon, the bases of the knives being separated to leave longitudinally extending spaces therebetween, a finger for each knife, an intermediate finger for each space between the knives, the bases of the knives being spaced apart sufficiently to leave longitudinally extending spaces between their bases and adjacent fingers when the apices of the knives are disposed in intermediate fingers, and means for operating the cutter-bar to move the knives bodily and completely through a finger during each reciprocation.

AMAND PAPE.

Witnesses:
 FRED GERLACH,
 AMY JEHLE.